United States Patent [19]
Matsuda et al.

[11] 3,720,719
[45] March 13, 1973

[54] PROCESS FOR POLYMERIZATION OF TETRAHYDROFURAN

[75] Inventors: Kazuo Matsuda, Wakayama; Yoshiaki Tanaka, Osaka; Takeyo Sakai, Wakayama, all of Japan

[73] Assignee: Kao Soap Co., Ltd., Chuo-ku, Tokyo, Japan

[22] Filed: Sept. 13, 1971

[21] Appl. No.: 180,175

[30] Foreign Application Priority Data

Sept. 16, 1970 Japan ............................ 45/81008

[52] U.S. Cl. ................................. 260/615 B
[51] Int. Cl. ....................... C07c 41/00, C07c 43/00
[58] Field of Search ............................ 260/615 B

[56] References Cited

UNITED STATES PATENTS

| | | | |
|---|---|---|---|
| 3,454,652 | 7/1969 | Dunlop et al. | 260/615 B |
| 2,856,370 | 10/1958 | Muetterties | 260/615 B |
| 3,359,332 | 12/1967 | Johnston | 260/615 B |
| 3,487,115 | 12/1967 | Lovell | 260/615 B |
| 2,751,419 | 6/1956 | Hill et al. | 260/615 B |

FOREIGN PATENTS OR APPLICATIONS

| | | | |
|---|---|---|---|
| 766,208 | 6/1953 | Germany | 260/615 |

*Primary Examiner*—Howard T. Mars
*Attorney*—Woodhams, Blanchard and Flynn

[57] ABSTRACT

Tetrahydrofuran is polymerized in the presence of a catalyst system of 5–50 percent by weight of fuming sulfuric acid, based on the weight of tetrahydrofuran, and 0.008–90 percent by weight of a metal belonging to Group V or VI in the Periodic Table, based on the free $SO_3$ content in the fuming sulfuric acid.

7 Claims, No Drawings

PROCESS FOR POLYMERIZATION OF TETRAHYDROFURAN

BACKGROUND OF THE INVENTION

1. Field of the Invention

This invention relates to a process for polymerization of tetrahydrofuran, and more particularly, it relates to a process for the ring-opening-polymerization of tetrahydrofuran in the presence of a novel improved catalyst.

2. Description of the Prior Art

Ordinarily, tetrahydrofuran is subjected to ring-opening-cationic polymerization in the presence of a Lewis acid catalyst and some of the protonic acids, and there are produced various polymers ranging in state from liquid to solid, depending on the degree of polymerization. It is, however, necessary to stop the polymerization by adding water and then hydrolyzing the chlorine atoms or acetylester groups at the terminals of the polymer to convert completely to hydroxyl groups for obtaining a polymer having diols at both ends. For this process, severe reaction conditions are required, and the process becomes more complicated, resulting in an increased loss of the polymer. There are also some catalysts which are corrosive to the materials of apparatus, such as fluoro-sulfonic acid.

We have proposed a process using fuming sulfuric acid (Japanese Patent application No. 15932/1969, corresponding to U.S. Ser. No. 13 839) for overcoming these defects. By this latter process a polymer of a good quality can be produced very economically, but polymers having an average molecular weight higher than 1,200 are difficult to obtain, and it is also difficult to control their molecular weight.

We have extensively investigated in order to solve these difficult problems, and discovered that the degree of polymerization and the molecular weight can be increased by causing a small amount of a metallic substance to coexist with fuming sulfuric acid in a given range of concentration and that the molecular weight of the produced polymer can be optionally controlled by changing the amount of catalyst of a given composition added to the system.

SUMMARY OF THE INVENTION

This invention provides a process for polymerizing tetrahydrofuran in the presence of fuming sulfuric acid having a free $SO_3$ content in the range of from about 15 percent by weight to about 43 percent by weight and additionally containing about 0.008 to 90 percent by weight of a metal compound belonging to Group V and VI in the Periodic Table, based on the weight of free $SO_3$ in the fuming sulfuric acid.

When the free $SO_3$ content of the fuming sulfuric acid exceeds 43 percent by weight, the polymer begins to be carbonized, and also the polymer is colored so much that it is hard to decolor by post-treatment. When the free $SO_3$ content of the fuming sulfuric acid is lower than 15 percent by weight, the yield of the polymerization cannot be increased even if the above-described co-catalyst is used. There is usually employed fuming sulfuric acid containing 23–28 percent by weight of free $SO_3$, which is readily available commercially.

The co-catalyst to be used, together with fuming sulfuric acid, is a compound such as an oxide or oxygen acid of a metal belonging to Group V or VI in the Periodic Table, such as vanadium, niobium, chromium, and molybdenum. About 0.008 to about 90 percent by weight of the co-catalyst compound is used, based on the weight of the free $SO_3$ in the fuming sulfuric acid.

The amount of fuming sulfuric acid catalyst used is in the range of 5–50 percent by weight based on the weight of tetrahydrofuran.

The polymerization reaction can be carried out in the presence or absence of a solvent. It is preferable to use a polymerization solvent only when it is necessitated, because it usually causes a reduction of the rate of polymerization. As solvents, there may be exemplified aliphatic hydrocarbons, alicyclic hydrocarbons, halogenated hydrocarbons, ethers and other substances that do not affect adversely the polymerization reaction. There is no limit as to the amount of the solvent to be used.

The polymerization reaction may be performed either in a nitrogen atmosphere or in air, provided that the reaction is kept free from moisture. The polymerization temperature is in the range of from −40° to 80°C., preferably from −20° to 10°C.

According to the process of this invention, the rate of polymerization and the molecular weight can be increased, compared with the process using only fuming sulfuric acid, and the molecular weight of the polymer can be controlled at will.

The molecular weight of the polymer can be controlled by varying the amount of the catalyst compared to the weight of tetrahydrofuran, keeping the ratio of fuming sulfuric acid to the metal co-catalyst compound constant. If the amount of the catalyst is reduced, both of the molecular weight and the rate of polymerization increases.

Some illustrative, nonlimiting examples of this invention are set forth hereinafter. In the examples, all parts and percentages are by weight, unless otherwise noted.

EXAMPLE 1

One hundred parts of tetrahydrofuran were placed in a 500 ml. four-mouthed flask provided with an agitator, a thermometer, a condenser, and a dropping funnel; the vessel was externally cooled and a nitrogen atmosphere was maintained therein. Tetrahydrofuran was agitated sufficiently, and the temperature in the system was maintained at −5° to 0°C. while a given amount of a catalyst composition, prepared by dissolving a given amount of chromium trioxide in fuming sulfuric acid at a room temperature or an elevated temperature, was added in drops into the polymerization system. The reaction was exothermic but the materials were sufficiently agitated and cooled so as to maintain the temperature no higher than 0°C. After the end of the catalyst addition, agitation was continued further for 2 hours at a temperature of from −5° to 0°C. Then, 200 parts of water were added to stop the polymerization. A dehydration tube was attached to a reflux condenser; the reaction product was heated on a water bath with agitation, and the unreacted monomer was collected through the dehydration tube. The product was further agitated for 2 hours with heating at 90°–100 °C. to hydrolyze the terminals of the polymer. The product was allowed to cool, and it separated into 2 layers. The upper layer was collected, neutralized, dehydrated, and desalted to obtain refined poly(tetrahydrofuran) having diols at both terminals.

The following table shows the effect of the amount of catalyst on the polymerization yield and the molecular weight.

Table 1: Relations between the amount of catalyst and the yield and the molecular weight of the produced polymer Weight ratio of $CrO_3/28\%$ fuming sulfuric acid $\cong 2.5/34$ (constant)

| 28% fuming sulfuric acid (g) | 16 | 21 | 34 |
|---|---|---|---|
| Amount of $CrO_3$ (g) | 1.18 | 1.54 | 2.5 |
| Yield - based on monomer (%) | 70.8 | 71.6 | 60.8 |
| Average molecular weight - calculated from the terminal OH groups | 4291 | 3120 | 1556 |

Control 1

Tetrahydrofuran was polymerized with a catalyst of only fuming sulfuric acid by a process similar to the one described in Example 1, and the results shown in Table 2 were obtained.

Table 2: Relations between the amount of catalyst and the yield and the molecular weight of the produced polymer

| Amount of 28% fuming sulfuric acid (g) | 15 | 21 | 34 |
|---|---|---|---|
| Yield - based on monomer (%) | 26 | 42.5 | 59.5 |
| Average molecular weight - calculated from the terminal OH groups | 1007 | 1020 | 760 |

As clearly seen in Tables 1 and 2, it is difficult to make the molecular weight higher than 1,000 using only fuming sulfuric acid as a catalyst, but when there is additionally present a small amount of chromium trioxide, the molecular weight can be varied regularly by varying the amount of catalyst, and thus there can be produced a polymer having the molecular weight higher than 1,000.

EXAMPLE 2

The process described in Example 1 was performed several times, using 100 parts of tetrahydrofuran and various amounts of a combination system of fuming sulfuric acid and vanadium pentoxide.

The catalyst was prepared by adding a given amount of vanadium pentoxide to fuming sulfuric acid and dissolving it by heating in a closed system; the catalyst was obtained as a red transparent solution.

The results are shown in Table 3.

Table 3: Relations between the amount of catalyst and the yield and the molecular weight of the produced polymer Weight ratio of 28% fuming sulfuric acid/vanadium pentoxide = 8.5 (constant)

| 28% fuming sulfuric acid (g) | 16 | 26 | 34 |
|---|---|---|---|
| Amount of $V_2O_5$ (g) | 1.88 | 3.06 | 4 |
| Yield - based on monomer (%) | 71.8 | 71.6 | 60.8 |
| Average molecular weight - calculated from the terminal OH groups | 3077 | 1549 | 990 |

EXAMPLE 3

According to the process described in Example 1, 100 parts of tetrahydrofuran were polymerized in the presence of a catalyst consisting of 43 percent fuming sulfuric acid — molybdenum trioxide composition, and a refined polyether glycol was obtained.

The results are shown in Table 4.

Table 4: Relations between the amount of catalyst and the molecular weight and the yield of the produced polymer Weight ratio of 43% fuming sulfuric acid/$MoO_3$ = 15.4 (constant)

| 43% fuming sulfuric acid (g) | 15 | 22 | 34 |
|---|---|---|---|
| $MoO_3$ (g) | 0.98 | 1.44 | 2.22 |
| Yield - based on monomer (%) | 64.2 | 63.3 | 53.8 |
| Average molecular weight - calculated from the terminal OH groups | 1711 | 1160 | 787 |

EXAMPLE 4

According to the process described in Example 1, 100 parts of tetrahydrofuran were polymerized in the presence of a catalyst consisting of 23 percent fuming sulfuric acid — barium chromate composition, and a refined polyether glycol was obtained.

The results are shown in Table 5.

Table 5: Relations between the amount of catalyst and the molecular weight and the yield of the produced polymer Weight ratio of 23% fuming sulfuric acid/$BaCrO_4$ = 16.8 (constant)

| 23% fuming sulfuric acid (g) | 16 | 21 | 34 |
|---|---|---|---|
| $BaCrO_4$ (g) | 0.95 | 1.25 | 2.02 |
| Yield - based on monomer (%) | 67.0 | 65.9 | 53.4 |
| Average molecular weight - calculated from the terminal OH groups | 3530 | 2730 | 1440 |

The embodiments of the invention in which an exclusive property or privilege is claimed are defined as follows:

1. A process for the polymerization of tetrahydrofuran, which comprises polymerizing tetrahydrofuran in the absence of water and in the presence of (a) from 5 to 50 percent by weight, based on the weight of tetrahydrofuran, of fuming sulfuric acid having a free $SO_3$ content of about 15 – 43 percent by weight and (b) a metal compound selected from the group consisting of barium chromate and oxides of chromium, vanadium, niobium and molybdenum in an amount in the range of 0.008 – 90 percent by weight based on the free $SO_3$ content in the fuming sulfuric acid, at a polymerization temperature in the range of −40° to +80°C. and then hydrolyzing the terminal group of the polymer.

2. The process as claimed in claim 1, wherein the free $SO_3$ content of said fuming sulfuric acid is in the range of from 23 percent by weight to 28 percent by weight.

3. The process as claimed in claim 1, wherein the polymerization reaction is carried out in the absence of a solvent.

4. The process as claimed in claim 1, wherein the polymerization reaction is carried out in the presence of a solvent selected from the group consisting of aliphatic hydrocarbons, alicyclic hydrocarbons, halogenated hydrocarbons and ethers.

5. The process as claimed in claim 1, wherein the reaction temperature is in the range of about −20° to about 10°C.

6. The process as claimed in claim 1, wherein the polymerization is stopped by the addition of water, then heating the polymerization system to recover non-reacted tetrahydrofuran, further heating the polymerization system at 90° − 100°C. to hydrolyze the polymer, cooling the polymerization system so as to separate the polymer having terminal hydroxyl groups at both ends of the molecule as an upper oil layer, subjecting the upper oil layer to neutralization, dehydration and desalting steps to obtain the purified polymer.

7. A process as claimed in claim 1, in which the metal in the polymerization system is added in the form of a compound selected from the group consisting of chromium trioxide, vanadium pentoxide, molybdenum trioxide and barium chromate.

* * * * *